No. 854,782. PATENTED MAY 28, 1907.
L. E. UNDERWOOD.
DYNAMO ELECTRIC MACHINE.
APPLICATION FILED OCT. 24, 1906.

WITNESSES
W. Ray Taylor.
Helen Alford

INVENTOR
Louis E. Underwood
by Albert H. Davis
Atty

UNITED STATES PATENT OFFICE.

LOUIS E. UNDERWOOD, OF LYNN, MASSACHUSETTS, ASSIGNOR TO GENERAL ELECTRIC COMPANY, A CORPORATION OF NEW YORK.

DYNAMO-ELECTRIC MACHINE.

No. 854,782.      Specification of Letters Patent.      Patented May 28, 1907.

Application filed October 24, 1906. Serial No. 340,307.

*To all whom it may concern:*

Be it known that I, LOUIS E. UNDERWOOD, a citizen of the United States, residing at Lynn, county of Essex, State of Massachusetts, have invented certain new and useful Improvements in Dynamo-Electric Machines, of which the following is a specification.

My invention relates to the construction of dynamo-electric machines and has for its object to improve the same.

In the ordinary motor or dynamo wherein a current-collecting device is placed at one end of the rotating armature, some portion of the machine must be arranged to provide space for the current-collecting device. Thus, one of the heads of the machine may be made deeper than the other in the axial direction and the current-collecting device housed within this enlarged head; or, if it is desired to have the two heads alike, one end of the field magnet frame may be extended or elongated and the current-collecting device located within the extended end of the field magnet structure. In the one case it is necessary to have differently shaped heads on the machine, and in the latter the armature cannot be turned end for end when, for any reason, it is desired to operate the machine in that way.

The present invention contemplates a construction and arrangement of parts whereby the heads of the machine may be made identical, if desired, and at the same time the machine may readily be adapted for operation with the armature turned end for end.

My invention will be more fully understood and its objects and advantages will be more clearly apparent from the following detailed description taken in connection with the accompanying drawing which illustrates preferred embodiments of my invention.

Figure 1:
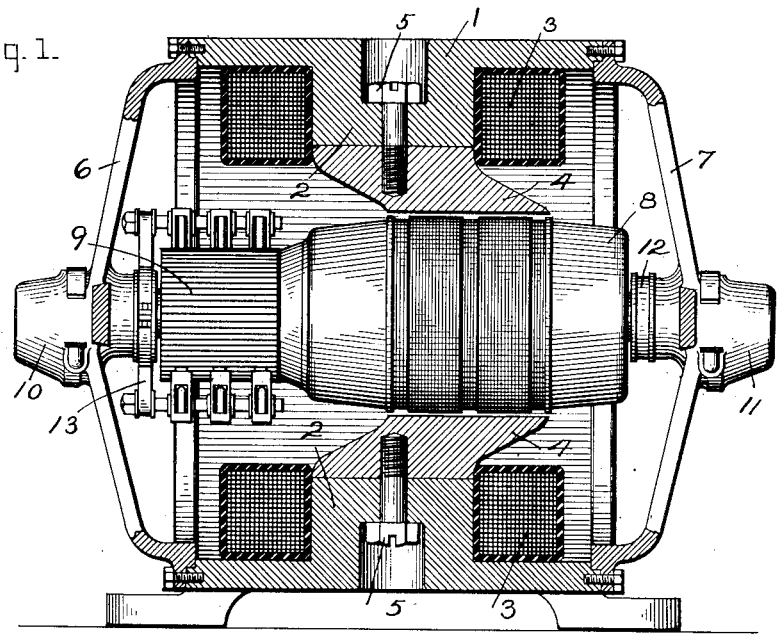
Figure 2:
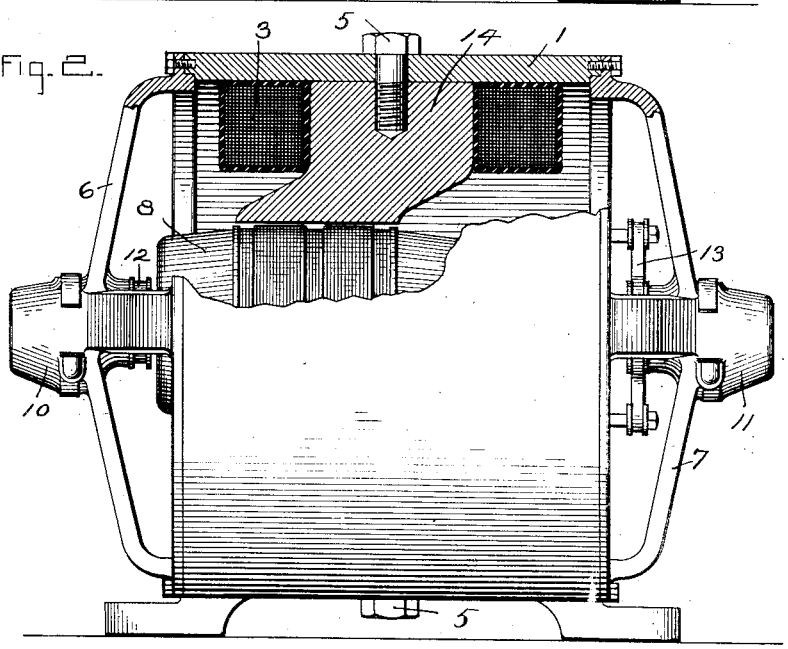

In said drawing, Figure 1 shows in longitudinal cross-section a motor arranged in accordance with my invention; and Fig. 2 is a view partly in side elevation and partly in longitudinal section of a further modification.

Referring to Fig. 1 of the drawing, 1 represents a field magnet frame having integral therewith polar projections 2, preferably arranged midway between the ends of the frame. 3 are energizing coils of any usual type surrounding the polar projections. 4 are pole-pieces or pole tips so formed that their pole faces are displaced or offset axially of the machine with respect to the polar projections; this displacement permitting the armature to be arranged unsymmetrically with respect to the field coils, so that space is provided within the field frame and two similar heads for both the armature and commutator. The amount of displacement is therefore dependent upon the length of the commutator. The polar tips may be secured to the polar projections in any suitable manner, as by means of screws 5. 6 and 7 are the motor heads, they being alike in all respects. 8 and 9 are the armature and the commutator, respectively, these being supported in the usual manner upon a shaft journaled in bearings 10 and 11 in the motor heads. The armature, it will be seen, is arranged within one end of the field frame and the commutator within the other; the pole faces of the field magnet structure being so situated as to produce the proper magnetic field for the armature.

When it is desired to run the motor with the armature turned end for end, the bolts 5 are loosened and the pieces 4 are turned through an angle of 180°; whereupon, when the armature and commutator have exchanged places so that the armature is on the left-hand end of the machine and the commutator on the right-hand end, (as in Fig. 2) the armature and the pole faces are in exactly the same relative positions as before. Each head of the motor is preferably provided with suitable means for receiving the brush holders as, for example, they may each have a boss 12 about which the supporting ring 13 for the brush holders may be clamped. Instead of making the polar projections integral with the frame and providing detachable pieces or tips, these members may be made integral with each other but detachable from the main frame, as at 14 in Fig. 2. In this case, of course, the whole pole-piece must be rotated when the position of the armature is reversed in the manner described. In neither form of my invention need the field magnet frame be made longer than is now customary, unless it is desired to house the armature and commutator wholly within the field frame, but the space required for the commutator may be provided in the motor-heads, each head furnishing one-half of the total amount.

Although I have illustrated only the best forms of my invention now known to me, I do not desire to be limited to these particular forms, since in its broader aspects the invention may be embodied in various other forms as will be evident from the appended claims.

What I claim as new and desire to secure by Letters Patent of the United States, is:

1. In a dynamo-electric machine, a field magnet frame having an offset polar portion, and means for permitting said polar portion to be adjusted axially of the machine into a plurality of positions.

2. In a dynamo-electric machine, a field magnet frame provided with a pole piece having an offset portion provided with a pole face, and means for securing the parts together so that the pole face may be displaced axially of the machine in either direction with respect to the pole-piece.

3. In a dynamo-electric machine, a field magnet frame provided with an energizing coil having its axis in a plane transverse to the axis of the machine, and a pole member constructed and arranged so as to be placed in operative relation to said coil with its pole face displaced axially of the machine in either direction from said plane.

4. In a dynamo-electric machine, a field magnet structure, and a pole piece detachable from said structure, said pole piece being constructed and arranged to be secured in position with its pole face displaced axially in either direction with respect to the axis of the pole piece.

5. In a dynamo-electric machine, a field magnet structure having a detachable polar portion, and an energizing coil surrounding said polar portion, said polar portion being constructed and arranged so that it may be secured in place with its pole face displaced axially of the machine in either direction with respect to the main portion of the polar portion.

6. In a dynamo-electric machine, a field magnet frame provided with pole pieces having pole faces displaced axially with respect to the body portion of the pole pieces, and means for enabling the pole faces to be positioned on either side of the plane of the body portions of the pole pieces.

7. In a dynamo-electric machine, a field magnet frame, exciting coils on said frame, and polar projections having pole faces arranged to be positioned so as to displace the pole faces axially with respect to the coils and in either direction.

8. In a dynamo-electric machine, a field magnet structure, energizing coils having axes transverse to the axis of the machine, pole pieces having offset pole faces, and means for securing said pole pieces so as to locate the pole faces on either side of the axes of the coils.

9. In a dynamo-electric machine, a field magnet structure having detachable polar portions provided with laterally-displaced pole faces, means for securing the said polar portions in place so as to bring the pole faces in either extreme position axially of the machine, an armature and current-collecting device, and means for supporting the armature and current-collecting device in either end for end relation depending upon the position of the pole faces.

10. In a dynamo-electric machine, a field magnet structure, similar heads at the ends of said structure, bearings in said heads for an armature shaft, an armature having a current-collecting device arranged at one end thereof, polar portions having pole faces, and means for securing said polar portions to the field magnet structure with the pole faces arranged in either of two axially-displaced planes depending upon the end for end relation of the armature and current collecting device in the machine.

11. In a dynamo-electric machine, a field magnet frame having a plurality of detachable polar portions provided with pole faces, and means for securing said polar portions in place so as to bring the pole faces into either of a plurality of axially-displaced positions.

In witness whereof, I have hereunto set my hand this twenty-second day of October, 1906.

LOUIS E. UNDERWOOD.

Witnesses:
JOHN A. McMANUS, Jr.,
PHILIP F. HARRINGTON.